United States Patent
Kevassay

(10) Patent No.: US 6,168,121 B1
(45) Date of Patent: Jan. 2, 2001

(54) CAPTIVE DEVICE FOR CONDUIT ANCHORING BUSH

(75) Inventor: Guy Kevassay, Le Pre Saint Gervais (FR)

(73) Assignees: Legrand; Legrand SNC, both of Limoges (FR)

(*) Notice: Under 35 U.S.C. 154(b), the term of this patent shall be extended for 0 days.

(21) Appl. No.: 09/209,043

(22) Filed: Dec. 10, 1998

(30) Foreign Application Priority Data

Dec. 10, 1997 (FR) .................................... 97 15631

(51) Int. Cl.$^7$ ................................. F16L 3/00; F16L 5/00
(52) U.S. Cl. ................................. 248/49; 248/56
(58) Field of Search .................... 248/56, 49; 411/45; 403/326, 329, 374.1; 174/65 G, 167, 65 SS, 151, 152 R, 153 R, 153 G, 152 G, 70 R

(56) References Cited

U.S. PATENT DOCUMENTS

| 4,387,267 | 6/1983 | Becker . | |
|---|---|---|---|
| 5,276,280 | * 1/1994 | Ball | 248/56 |
| 5,410,104 | * 4/1995 | Gretz et al. | 248/56 |
| 5,773,759 | * 6/1998 | Hablutzel | 248/56 |
| 5,811,728 | * 9/1998 | Maeda | 248/56 |

FOREIGN PATENT DOCUMENTS

| 3240701 | 5/1984 | (DE) | H02G 3/18 |
|---|---|---|---|
| 2480026 | 10/1981 | (FR) | H01G 15/00 |
| 2501928 | 9/1982 | (FR) | H02G 15/013 |
| 2526597 | 11/1983 | (FR) | H02G 15/02 |

* cited by examiner

Primary Examiner—Anita M. King
Assistant Examiner—Jerome DeLuca
(74) Attorney, Agent, or Firm—Young & Thompson

(57) ABSTRACT

A device for anchoring a conduit, in particular an electrical cable, into a body, in particular a connector body, including a plug mounting on said body and an anchor bush disposed in said plug and which can assume an unclamped configuration or a clamped configuration depending on the position of said plug in said body, wherein said anchor bush and said plug are provided with complementary means for retaining said anchor bush in said plug.

26 Claims, 3 Drawing Sheets

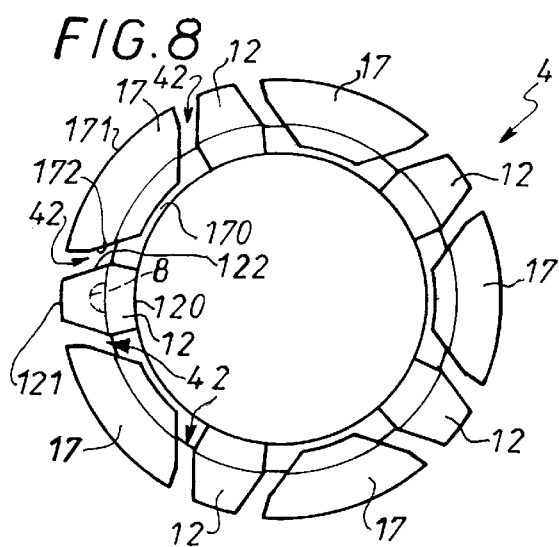
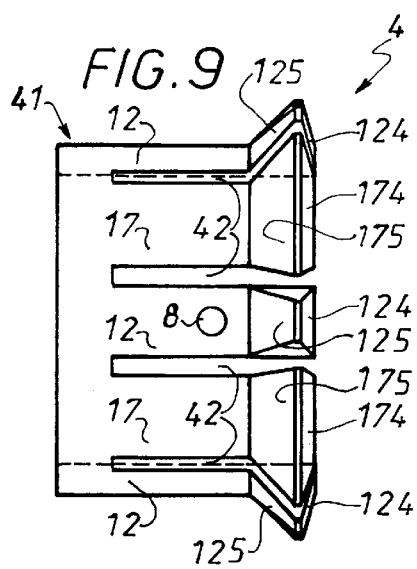
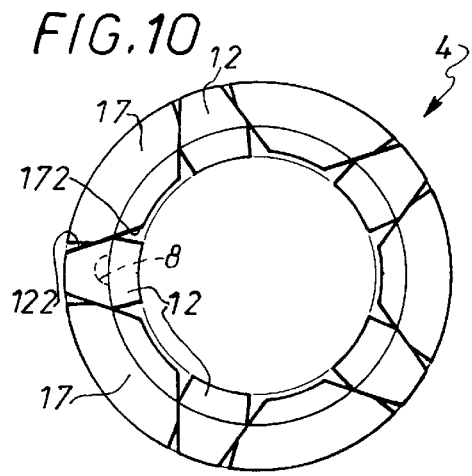
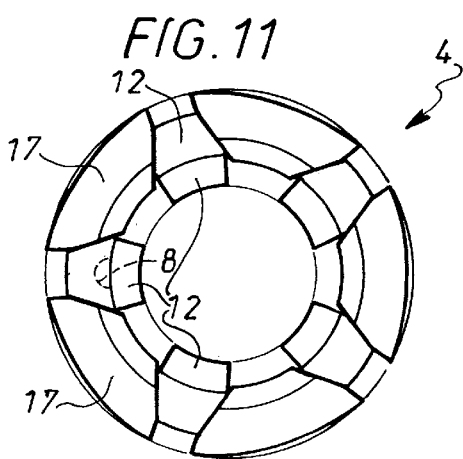
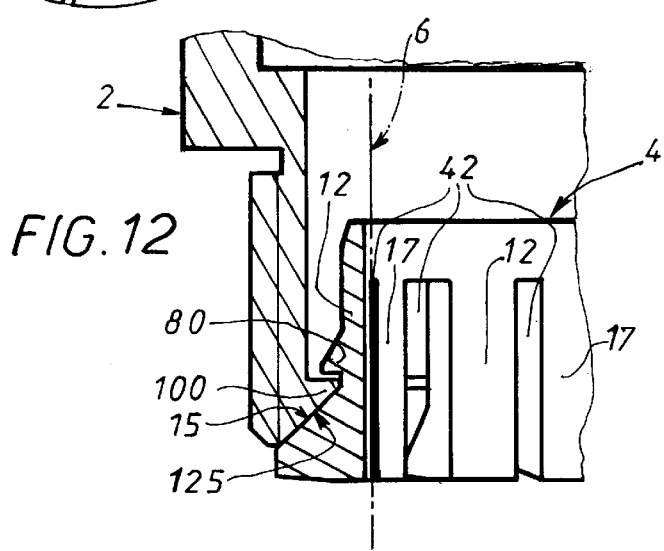

CAPTIVE DEVICE FOR CONDUIT ANCHORING BUSH

BACKGROUND OF THE INVENTION

1. Field of the Invention

The present invention concerns a device for anchoring a conduit such as a cable or pipe into a body. To be more precise it concerns a device of the above kind including a plug which screws onto said body an anchor bush retained in the plug after multiple screwing and unscrewing of the body and the plug.

2. Description of the Prior Art

Devices for anchoring a cable or a pipe passing through a wall are already known in themselves. French patent No. 2 480 026 and the corresponding certificate of addition No. 2 526 597 describe one such device. In a device of this kind the anchor bush is not retained in the plug when the plug and the body are not screwed together. This causes problems, in particular when fitting the conduit into the device: it is difficult to position and to pass the conduit through before screwing. Also, the fitter may forget to fit the anchor bush, because it is not captive; this leads to the loss of the functions associated with the anchor bush.

The invention aims to solve the above problems:

by retaining the anchor bush in the plug before and after multiple mounting and demounting of the body and the plug;

by facilitating the positioning and the passing through of the conduit before mounting;

by facilitating the mounting and demounting of the body and of the assembly comprising the plug and the anchor bush; as the conduit is not rotated during this maneuver, it is not subjected to any torsion.

SUMMARY OF THE INVENTION

With the above aims in view, the invention proposes a device for anchoring a conduit, in particular an electrical cable, into a body, in particular a connector body, including a plug mounting on said body and an anchor bush disposed in said plug and which can assume an unclamped configuration or a clamped configuration depending on the position of said plug in said body, wherein said anchor bush and said plug are provided with complementary means for retaining said anchor bush in said plug.

Accordingly the device of the invention retains the anchor bush in the plug before and after multiple mounting and demounting of the body and the plug.

The device also has the advantages of a prior art device; in particular, it enables different diameter conduits to be attached using the same anchor bush and guarantees a seal when it incorporates a packing.

In one preferred embodiment of the device the anchor bush is not only retained in the plug but is also immobilized therein by virtue of complementary shapes before mounting and after demounting of the body and the plug.

The device is preferably such that the anchor bush is in its unclamped configuration before screwing together and after unscrewing the plug and the body.

The above embodiments are preferred because, in particular, they facilitate positioning and passing through of the conduit.

A very simple embodiment of the complementary means for retaining the anchor bush in the plug consists in providing the anchor bush with at least one radially projecting lug and the plug with at least one radially recessed imprint adapted to receive said at least one lug.

The device can include an anchor bush including at least one radially projecting lug and a plug including a plurality of radially recessed imprints adapted to receive said at least one lug.

In one embodiment of the device the anchor bush includes a plurality of radially projecting lugs and the plug includes a plurality of radially recessed imprints, the number of which is equal to the number of lugs, each of the imprints being adapted to receive one of said lugs.

The presence of a plurality of imprints on the plug facilitates mounting the anchor bush in the plug: this makes it easier to find an imprint without having to turn the anchor bush very far.

Each lug is advantageously in the form of a spherical dome: this allows progressive mounting and demounting of the anchor bush in the plug.

At least one imprint is advantageously in the form of a groove with two longitudinal flanks limited axially by a rim.

From a situation in which each lug is accommodated in an imprint, mounting the plug on the body preferably grips the anchor bush which causes each lug to escape from the imprint in which it was accommodated. This facilitates mounting, in particular by allowing the anchor bush to rotate freely when it grips the conduit. Undesirable torsion stresses on the conduit are avoided.

In one preferred embodiment of the device the anchor bush has a set of cuneiform fingers alternating with a set of blades for driving the fingers, at least one of the fingers carrying a lug; each finger can carry a lug.

The body and the plug form a tubular passage when the body and the plug are mounted one on the other and in one advantageous embodiment of the device, from a situation in which each lug is housed in an imprint, the clamping of the plug onto the body curves the tubular passage inwardly due to the action of the drive blades of at least each finger that has a lug; this can be achieved in particular through the action of the drive blades.

In one more particular and preferred embodiment the anchor bush has five radially projecting lugs and the plug has five imprints each adapted to receive one lug.

The features and advantages of the invention will emerge further from the following description given by way of example with reference to the appended diagrammatic drawings.

BRIEF DESCRIPTION OF THE DRAWINGS

FIGS. 8, 9, 10 and 11 show an anchor bush.

FIG. 12 shows a variant of the device of the invention.

DETAILED DESCRIPTION OF THE PREFERRED EMBODIMENTS

Figure 1:
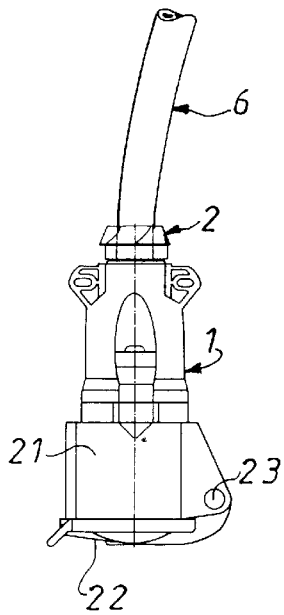
FIG. 1 shows a connector using the device of the invention.

In the chosen embodiment represented here the invention is applied to a connector as shown in FIG. 1 constituting a waterproof plug or socket. A connector of this kind has a body 1 and a plug 2 that form a passage for a cable 6 towards one end 21 of the connector. The connector has a cover 22 which pivots on a hinge pin 23.

Figure 2:
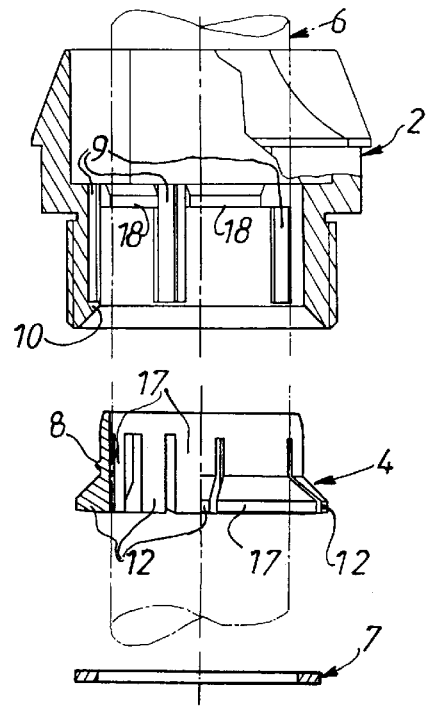
FIG. 2 is an exploded view, partly in section, partly in outside view and partly in cutaway outside view, of the device in accordance with the invention.
Figure 2:
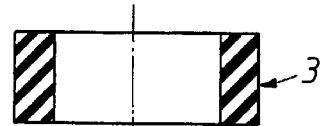
Figure 2:
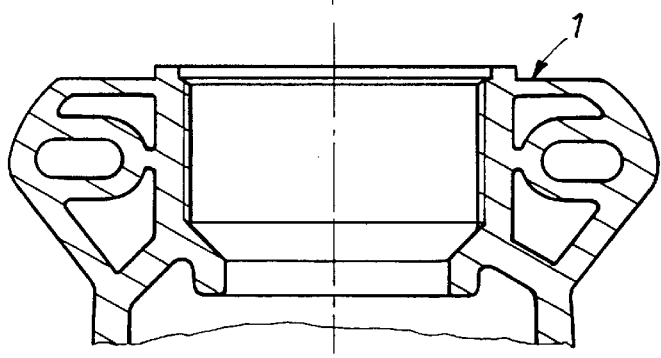
Figure 3:
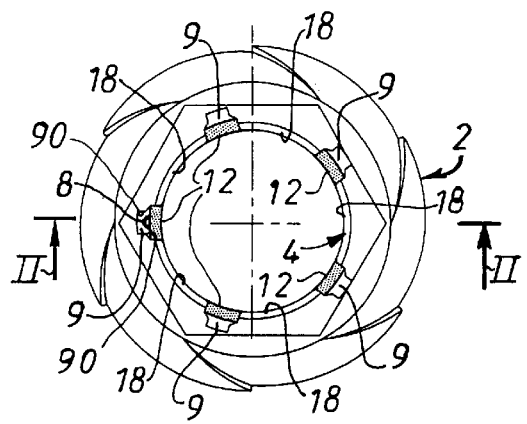
FIG. 3 is an external view of a part of the device of the invention.
Figure 4:
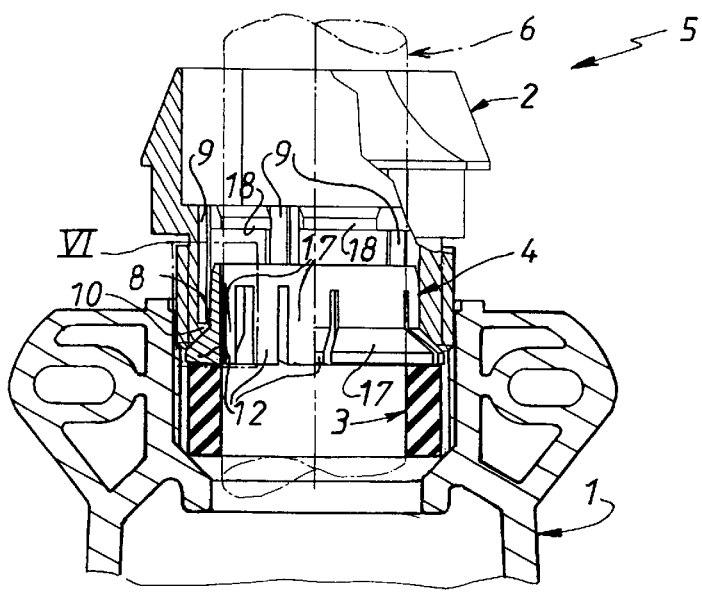
FIG. 4 is a view partly in section, partly in outside view and partly in cutaway outside view of the device of the invention before clamping or after unclamping of the body and the plug.
Figure 5:
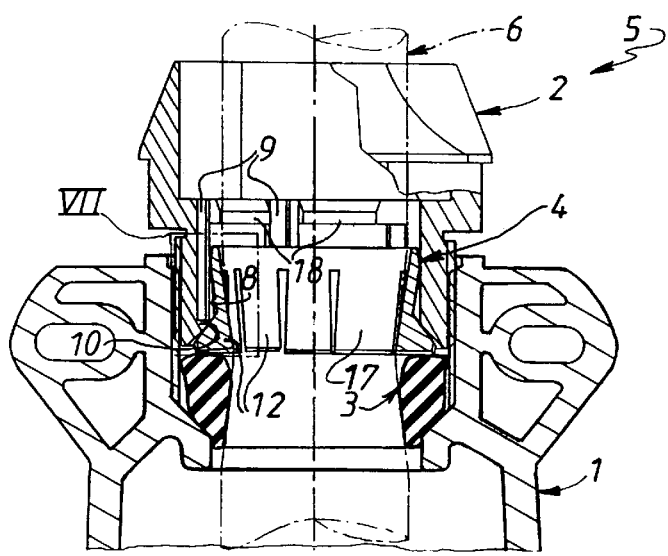
FIG. 5 is a representation similar to the previous one showing the device after clamping or before unclamping of the body and the plug.
Figure 6:
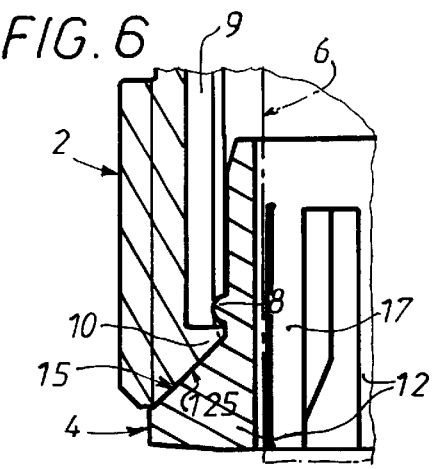
FIG. 6 is a view in section to a large scale of the area around the lug before clamping or after unclamping of the body and the plug.

FIG. 2 shows the various parts of the device: the body 1, the plug 2, an annular seal 3, an anchor bush 4 and a washer 7. The body and the plug screw one onto the other and then form a tubular body 5 (FIGS. 4 and 5). The cable 6 passes through said tubular body. Imprints 9 form between two flanks 90 grooves limited axially at one end by a rim 10 (FIGS. 3 and 6). The plug 2 has projecting parts 18 offset relative to the imprints 9 (FIGS. 2, 3 and 5).

FIGS. 8 and 9 show the anchor bush; it includes a base 41 and is divided by axial slots 42 into an alternating series of blades 17 and fingers 12 extending most of the axial length of the anchor bush from the base 41. The blades 17 (respectively the fingers 12) have a rounded inside part 170 (respectively 120) and a rounded end part 171 (respectively 121). Ramps 172 (respectively 122) are provided on the blades 17 (respectively the fingers 12). The fingers are cuneiform; as shown in FIG. 10, the aforementioned adjacent ramps are of complementary shape. One of the fingers has a lug 8 in the form of a spherical dome. FIG. 9 shows the blades (respectively the fingers) rooted at one end in the base of the anchor bush and having at their other end an enlarged part 174 (respectively 124). The blades (respectively the fingers) have a ramp 175 (respectively 125) which is complementary to a ramp 15 on the plug (FIGS. 6 and 9).

To mount the anchor bush in the plug it is slid into the plug until the lug clips into one of the imprints; to facilitate this the finger carrying the lug can be flexed towards the interior of the plug. This facilitates movement of the lug over the rim during mounting. The lug 8 accommodated in the imprint 9 retains the anchor bush in the plug before and after multiple screwing and unscrewing of the body and the plug.

FIG. 6 shows how the anchor bush is immobilized in the plug, in the embodiment described, by complementary shapes before multiple screwings and after multiple unscrewings of the plug and the body. Movement of the anchor bush in axial translation is prevented by the presence of the rim 10, of the lug 8, of the enlarged part 125 and of the ramp 15. Axial rotation is also prevented by the presence of the lug and the flanks 90 of the imprint.

Before tightening (FIG. 4) the anchor bush is placed in the plug and the seal is placed in the body. The body and the plug are offered up to each other end-to-end ready to be screwed together. The anchor bush is in the unclamped configuration and the seal is not compressed; FIG. 8 shows the relative positions of the teeth and of the blades in this situation.

The body and the plug are then screwed together (FIG. 5). The ramp 15 on the plug is adapted to cooperate with the ramps 125 and 175 on the anchor bush when the body is screwed onto the plug; by the reciprocal action of the pressure of the anchor bush and of the seal, on the one hand, the anchor bush closes up in its split part and, on the other hand, the seal is compressed axially and spreads radially to provide the seal. The closing up of the split part of the anchor bush is shown during a first stage in FIG. 10, where the blades and the fingers have just come into contact with each other, and at a later stage in FIG. 11; by reciprocal action of the ramps 172 and the adjacent ramps 122 the fingers are obliged to close up further; the fingers act like claws which grip the cable (FIGS. 8, 10 and 11). FIG. 6 shows the anchor bush in the clamped configuration; the tighter the body is screwed onto the plug, the more the anchor bush is closed onto the body. This is beneficial for gripping cables of small diameter.

During a first phase of loosening the plug will rotate relative to the anchor bush, because it is gripping the cable. The anchor bush is progressively loosened and the fingers of the anchor bush release the cable; the plug continues to turn about the bush until it is loose enough to enable a lug to be captured in a groove. The anchor bush is then attached to the plug; it is entrained by and retained by the plug.

FIG. 6 also shows that the anchor bush disposed in the plug is in the unclamped configuration before multiple screwing and after multiple unscrewing of the plug and the body. This arrangement facilitates passing through the cable.

Figure 7:
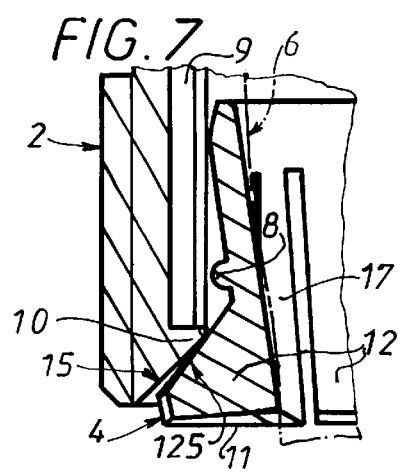
FIG. 7 is a similar representation to the previous one after clamping or before unclamping of the body and the plug.

FIG. 7 shows how the anchor bush has its fingers in the clamped configuration after multiple screwing or before multiple unscrewing of the plug and the body. This figure also shows that the lug escapes from the groove in an unclamped configuration of the anchor bush; this is to allow free rotation of the plug when the anchor bush is gripping the cable. This prevents unwanted torsion stresses on the cable. The projecting parts 18 prevent the bush 4 escaping from the plug 2. The projecting parts 18 are offset relative to the groves 9 to enable molding of the plug 2.

The seal provides a seal where the cable passes through the plug.

The plug, the body and the anchor bush are molded by a plastics material, for example. The seal must seal the device and is therefore advantageously made from an elastic material such as rubber.

The washer 7 disposed in an alternative embodiment between the anchor bush and the seal reduces shear forces on the seal due to the anchor bush; this makes it easier to close up the anchor bush. The material from which such means are made is chosen for optimum sliding of one member relative to the other. These members are preferably smooth to facilitate sliding.

FIG. 12 shows the device of the invention with a rim 100 all around the plug and a detent 80 on a finger and which has the shape of half an arrowhead when seen in cross section. A detent of this kind can equally be provided on a blade. There can be several such detents around the periphery of the anchor bush, for example only on the fingers or only on the blades, or both on the fingers and on the blades. In this way a complete ring of detents can be provided. The rim 100 all around the plug guarantees that the anchor bush is retained in the plug after unscrewing.

It may be advantageous to provide more than one groove in the plug. FIG. 3 shows five grooves. There can be one or more corresponding lugs on the plug; FIG. 3 shows only one lug. An embodiment with a plurality of grooves and a corresponding plurality of lugs provides better retention and better stability of the anchor bush in the plug.

In a preferred embodiment there are five lugs in corresponding relationship with five grooves.

The device of the invention is particularly intended to seal and to anchor a cable into a plug or into a circuit; especially if such members must be used in an atmosphere requiring a very good seal, for example an explosive atmosphere.

There is claimed:

1. A device for anchoring a conduit or an electrical cable in a connector body, comprising a plug mountable on and demountable from a connector body and an anchor bush received in said plug and selectively assuming an unclamped and a clamped configuration depending on the position of said plug in a connector body, complementary means on said anchor bush and said plug for retaining said anchor bush captive in said plug prior to mounting said plug on a connector body or after demounting said plug from a connector body.

2. The device claimed in claim 1, wherein said complementary means comprise respective portions on said plug and said anchor bush of complementary shape, thereby immobilizing said anchor bush on said plug.

3. The device claimed in claim 1, wherein said plug has a threaded portion threadably engageable with a threaded portion on a connector body, said anchor bush assuming an unclamped configuration when said plug is unscrewed from a connector body and a clamped configuration when said plug is screwed on a connector body.

4. The device claimed in claim 1, wherein said anchor bush includes at least one radially projecting lug and said plug includes at least one radial recess adapted to receive said at least one lug, said at least one radially projecting lug and said at least one radial recess comprising said complementary means for retaining said anchor bush captive in said plug.

5. The device according to claim 4, wherein each of said lugs is part-spherical in shape.

6. The device claimed in claim 4, wherein at least one recess forms a groove having two longitudinal flanks and axially limiting rim.

7. The device claimed in claim 4, wherein said at least one radially projecting lug escapes from said at least one radial recess when said plug is mounted on a connector body.

8. The device claimed in claim 4, wherein said anchor bush has a set of cuneiform fingers alternating with a set of blades for driving said fingers, at least one of said fingers carrying a lug.

9. The device claimed in claim 8, wherein each of said fingers carries a said lug.

10. The device claimed in claim 8, wherein a connector body and said plug form a tubular passage, when said plug is clamped onto a connector body, said at least one finger carrying a lug extending inwardly of said tubular passage driven by said drive blades.

11. The device claimed in claim 1, wherein said anchor bush includes at least one radially projecting lug and said plug includes a plurality of radial recesses for selectively receiving said at least one lug, said at least one radially projecting lug and said plurality of radial recesses comprising said complementary means for retaining said anchor bush captive in said plug.

12. The device claimed in claim 1, wherein said complementary means comprises a plurality of radially projecting lugs on said anchor bush and a corresponding plurality of radial recesses on said plug, each of said recesses being adapted to receive one of said radially projecting lugs.

13. The device claimed in claim 1, wherein said complementary means comprises five radially projecting lugs on said anchor bush and five radially recesses on said plug adapted to receive respective radially projecting lugs.

14. An assembly for anchoring a conduit or an electrical cable, comprising a connector body, a plug mountable on and demountable from said connector body and an anchor bush received in said plug and selectively assuming an unclamped and a clamped configuration depending on the position of said plug in said connector body, complementary means on said anchor bush and said plug for retaining said anchor bush captive in said plug prior to mounting said plug on said connector body or after demounting said plug from said connector body.

15. The assembly claimed in claim 14, wherein said complementary means comprises respective portions on said plug and anchor bush of complementary shape, thereby immobilizing said anchor bush on said plug.

16. The assembly claimed in claim 14, wherein said plug has a threaded portion threadably engageable with a threaded portion on said connector body, said anchor bush assuming an unclamped configuration when said plug is unscrewed from said connector body and a clamped configuration when said plug is screwed on said connector body.

17. The assembly claimed in claim 14, wherein said anchor bush includes at least one radially projecting lug and said plug includes at least one radial recess adapted to receive said at least one lug, said at least one radially projecting lug and said at least one radial recess comprising said complementary means for retaining said anchor bush captive in said plug.

18. The assembly according to claim 17, wherein each of said lugs is part-spherical in shape.

19. The assembly claimed in claim 17, wherein at least one recess forms a groove having two longitudinal flanks and an axially limiting rim.

20. The assembly claimed in claim 17, wherein said at least one radially projecting lug escapes from said at least one radial recess when said plug is mounted on said connector body.

21. The assembly claimed in claim 17, wherein said anchor bush has a set of cuneiform fingers alternating with a set of blades for driving said fingers, at least one of said fingers carrying a lug.

22. The assembly claimed in claim 21, wherein each of said fingers carries a said lug.

23. The assembly claimed in claim 21, wherein said connector body and said plug form a tubular passage, and when said plug is clamped onto said connector body, said at least one finger carrying a lug extending inwardly of said tubular passage driven by said drive blades.

24. The assembly claimed in claim 14, wherein said anchor bush includes at least one radially projecting lug and said plug includes a plurality of radial recesses for selectively receiving said at least one lug, said at least one radially projecting lug and said plurality of radial recesses comprising said complementary means for retaining said anchor bush captive in said plug.

25. The assembly claimed in claim 14, wherein said complementary means comprises a plurality of radially projecting lugs on said anchor bush and a corresponding plurality of radial recesses on said plug, each of said recesses being adapted to receive one of said radially projecting lugs.

26. The assembly claimed in claim 14, wherein said complementary means comprise five radially projecting lugs on said anchor bush and five radial recesses on said plug adapted to receive respective radially projecting lugs.

* * * * *